United States Patent
Macbeth et al.

(10) Patent No.: US 6,972,937 B1
(45) Date of Patent: Dec. 6, 2005

(54) ARC FAULT CIRCUIT DETECTOR HAVING TWO ARC FAULT DETECTION LEVELS

(75) Inventors: Bruce F. Macbeth, Syracuse, NY (US); Jeffrey C. Richards, Baldwinsville, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 10/915,965

(22) Filed: Aug. 11, 2004

Related U.S. Application Data

(63) Continuation-in-part of application No. 09/990,809, filed on Nov. 16, 2001, now Pat. No. 6,798,628, and application No. 09/788,206, Feb. 16, 2001, now Pat. No. 6,839,208.

(60) Provisional application No. 60/249,480, filed on Nov. 17, 2000, provisional application No. 60/183,287, filed on Feb. 17, 2000.

(51) Int. Cl.$^7$ .............................................. H02H 3/00
(52) U.S. Cl. ..................................................... 361/42
(58) Field of Search ............................. 361/42, 43, 44, 361/45, 46, 47, 48, 49

(56) References Cited

U.S. PATENT DOCUMENTS

| | | | |
|---|---|---|---|
| 5,307,230 A | | 4/1994 | MacKenzie |
| 5,729,145 A | * | 3/1998 | Blades ........................ 324/536 |
| 5,835,321 A | | 11/1998 | Elms et al. |
| 6,246,556 B1 | | 6/2001 | Haun et al. |
| 6,373,257 B1 | * | 4/2002 | Macbeth et al. ............ 324/536 |
| 6,377,427 B1 | | 4/2002 | Haun et al. |
| 6,414,829 B1 | * | 7/2002 | Haun et al. .................... 361/42 |
| 6,625,550 B1 | * | 9/2003 | Scott et al. .................... 702/58 |
| 6,798,628 B1 | * | 9/2004 | Macbeth ....................... 361/42 |
| 6,839,208 B2 | * | 1/2005 | Macbeth et al. ............... 361/42 |
| 2003/0072113 A1 | | 4/2003 | Wong et al. |
| 2004/0066593 A1 | | 4/2004 | Kolker et al. |

* cited by examiner

Primary Examiner—Ronald Leja
(74) Attorney, Agent, or Firm—Bond, Schoeneck & King, PLLC; Daniel P. Malley

(57) ABSTRACT

The present invention is directed to an arc fault protective device that includes a sensor configured to generate a sensor signal in response to an electrical current signal propagating in an electrical distribution system. A level detection circuit is coupled to the electrical distribution system. The level detection circuit is configured to generate a first level detection signal if a magnitude of the electrical current signal is between a first predetermined threshold level and a second predetermined threshold level. The level detection circuit also is configured to generate a second level detection signal if a magnitude of the electrical current signal is greater than the second predetermined threshold level. An arc detection circuit is coupled to the sensor and the level detection circuit. The arc detection circuit is configured to compare the sensor signal to a first arc fault signature and a second arc fault signature. The arc detection circuit is configured to provide an arc detection signal in response to the first level detection signal if the sensor signal corresponds to the first arc fault signature. The arc detection circuit also is configured to provide an arc detection signal in response to the second level detection signal if the sensor signal corresponds to the second arc fault signature. A response mechanism is coupled to the arc detection circuit, the response mechanism being responsive to the arc detection signal.

28 Claims, 1 Drawing Sheet

ARC FAULT CIRCUIT DETECTOR HAVING TWO ARC FAULT DETECTION LEVELS

CROSS-REFERENCE TO RELATED APPLICATIONS

This is a continuation-in-part of U.S. patent application Ser. No. 09/788,206, now U.S. Pat. No. 6,839,208, filed on Feb. 16, 2001 and U.S. patent application Ser. No. 09/990,809, now U.S. Pat. No. 6,798,628, filed on Nov. 16, 2001, the contents of which are relied upon and incorporated herein by reference in their entirety, and the benefit of priority under 35 U.S.C. §120 is hereby claimed. U.S. patent application Ser. No. 09/788,206 claims the benefit of priority to U.S. Provisional Application Ser. No. 60/183,287 filed on Feb. 17, 2000 and U.S. patent application Ser. No. 09/990,809 claims the benefit of priority U.S. Provisional Application Ser. No. 60/249,480 filed on Nov. 17, 2000, the contents of which are also relied upon and incorporated herein by reference in their entirety, and the benefit of priority under 35 U.S.C. §119(e) is hereby claimed.

BACKGROUND OF THE INVENTION

1. Field of the Invention

The present invention relates generally to electrical wiring devices, and particularly to electrical wiring devices including arc fault detectors.

2. Technical Background

Breaker panels are employed to distribute electrical power to various points within a building or facility. AC power from a utility source is terminated at the breaker panel. The breaker panel distributes AC power to one or more branch electric circuits disposed in the facility. The electric circuits transmit AC power to one or more electrically powered devices, commonly referred to in the art as load circuits. Each electric circuit typically employs one or more electric circuit protection devices such as an arc fault circuit interrupter (AFCI).

An AFCI may be conveniently packaged in a receptacle that is configured to be installed in a wall box. The receptacle includes input terminals configured to be connected to an electric branch circuit, i.e., the receptacle includes a hot line terminal and a neutral line terminal for connection to a hot power line and a neutral power line, respectively. The receptacle includes output terminals configured to be connected to a load circuit. In particular, the output terminals may include feed-through terminals that include a hot load terminal and a neutral load terminal. The output terminals may include user accessible plug receptacles connected to the feed through terminals. Accordingly, load devices equipped with a cord and plug may access AC power by way of the user accessible plug receptacles. An AFCI may also be disposed in the breaker panel itself.

When a fault condition is detected, the protection device eliminates the fault condition by interrupting the flow of electrical power to the load circuit by causing interrupting contacts to break the connection between the line terminals and load terminals. As indicated by the name of each respective device, an AFCI protects the electric circuit in the event of an arc fault. An arc fault is a discharge of electricity between two or more conductors. An arc fault may be caused by damaged insulation on the hot line conductor or neutral line conductor, or on both the hot line conductor and the neutral line conductor. The damaged insulation may cause a low power arc between the two conductors and a fire may result. An arc fault typically manifests itself as a high frequency current signal. Accordingly, an AFCI may be configured to detect various high frequency signals and de-energize the electrical circuit in response thereto.

As defined in the Underwriters Laboratories standard 1699, requirements for certain types of arc fault circuit interrupters (AFCI), namely combination devices, requires such devices to sense a wide range of arcing conditions and interrupt the flow of electrical current before the arcing condition causes a fire. Arcing conditions that a combination device are required to interrupt include what has been referred to in the industry as "A-type" faults and "B-type" faults. An "A-type" fault, also known as a series fault, may be generated by a break in a line conductor or a neutral conductor. This type of fault may also be occasioned by a loose terminal in a branch circuit of a distribution network. The arc may also be caused by an extension cord break, or by a loose terminal in an extension cord that propagates power from line voltage to a load. As noted above, an A-type fault is known as a series fault. This is because the fault is in series with the load. The current through the "A-type" fault is limited by the impedance of the load itself. Accordingly, the AFCI must detect series faults in which the load current is as low as 5 amperes. This current level has been determined by UL to be the lowest rated load current by which a series arc fault is likely to cause a fire. The AFCI must detect series faults associated with load currents greater than 5 Amperes but not greater than 30 Amperes. Loads greater than 30 Amperes are unlikely since the maximum rating of the overcurrent device (fuse or circuit breaker) that couples power to the branch circuit is 20 Amperes. Stated generally, series arc fault conditions occur in loads between a first rated current below which a fire hazard is unlikely to occur, and a second rated current. Loads above the second rated current level are simply not likely to exist. The unlikeliness may be due to a load-selective feature in the electrical distribution system. "B-type" faults are a second type of arcing condition that must be detected and interrupted by a combination device. "B-type" faults are also known as parallel faults. In a B-type fault, the arc occurs across two conductors in the branch circuit or across extension cords plugged having worn insulating media separating the two conductors. Parallel arcs may occur across the line and neutral conductors or the line and ground conductors, or in the case of reverse polarity, where the line voltage is reverse-polarized, between the neutral and ground conductors. The current through the B-type fault is not limited by the impedance of the load, but by the available current from the supply. The available current is established by the impedance of the conductors and terminals between the source of line voltage and the position of the parallel fault, i.e., by the conductive members carrying the fault current. The combination arc fault circuit interrupter outlet device must detect parallel arc faults in which the available current to the parallel fault is as high as 500 amperes. The overcurrent device, i.e. whether a fuse or circuit breaker, must afford protection above this level.

Considering both series and parallel arc faults, the combination AFCI must be able to cover a range of fault currents from 5 amperes to 500 amperes. The test methodologies in the UL standard for generating series and parallel arc faults differ in order to establish the two different types of faults. The standard allows for a longer interrupting time of the AFCI for lower energy arcs (series) than for higher energy arcs (parallel) without sacrificing the protective benefit or risking ignition of nearby combustibles.

SUMMARY OF THE INVENTION

One aspect of the present invention is directed to an arc fault protective device that includes a sensor configured to generate a sensor signal in response to an electrical current signal propagating in an electrical distribution system. A level detection circuit is coupled to the electrical distribution system. The level detection circuit is configured to generate a first level detection signal if a magnitude of the electrical current signal is between a first predetermined threshold level and a second predetermined threshold level. The level detection circuit also is configured to generate a second level detection signal if a magnitude of the electrical current signal is greater than the second predetermined threshold level. An arc detection circuit is coupled to the sensor and the level detection circuit. The arc detection circuit is configured to compare the sensor signal to a first arc fault signature and a second arc fault signature. The arc detection circuit is configured to provide an arc detection signal in response to the first level detection signal if the sensor signal corresponds to the first arc fault signature. The arc detection circuit also is configured to provide an arc detection signal in response to the second level detection signal if the sensor signal corresponds to the second arc fault signature. A response mechanism is coupled to the arc detection circuit, the response mechanism being responsive to the arc detection signal.

In another aspect, the present invention is directed to an arc fault protective device that includes a sensor configured to generate a sensor signal in response to an electrical current signal propagating in an electrical distribution system. A level detector is coupled to the electrical distribution system. The level detector compares a magnitude of the electrical current signal to at least one predetermined threshold level, the level detector providing at least one control signal if the magnitude is greater than the at least one predetermined threshold level. An arc detector is coupled to the at least one sensor and the level detector. The arc detector provides an arc detection signal in response to the at least one control signal if the sensor signal corresponds to the arc fault signature. A response mechanism is coupled to the arc detector that is responsive to the detected arc fault.

In another aspect, the present invention is directed to an arc fault protective device that includes a sensor configured to generate a sensor signal in response to an electrical current signal propagating in an electrical distribution system. A level detection circuit is coupled to the electrical distribution system. The level detection circuit is configured to generate a first level detection signal if a magnitude of the electrical current signal is between a first threshold substantially equal to five (5) amperes and a second threshold substantially equal to thirty (30) amperes, the level detection circuit also being configured to generate a second level detection signal if a magnitude of the electrical current signal is greater than thirty (30) amperes. An arc detection circuit is coupled to the sensor and the level detection circuit. The arc detection circuit is configured to compare the sensor signal to a first arc fault signature and a second arc fault signature. The arc detection circuit is configured to provide an arc detection signal in response to the first level detection signal if the sensor signal corresponds to the first arc fault signature, and the arc detection circuit also being configured to provide an arc detection signal in response to the second level detection signal if the sensor signal corresponds to the second arc fault signature. A circuit interrupter is coupled to the arc detection circuit. The circuit interrupter is configured to disconnect a load from the electrical distribution system in response to the arc detection signal.

In another aspect, the present invention is directed to an arc fault protective device that includes a sensor configured to generate a sensor signal in response to an electrical current signal propagating in an electrical distribution system. A level detection circuit is coupled to the electrical distribution system. The level detection circuit is configured to generate a first level detection signal if a magnitude of the electrical current signal is between a first threshold substantially equal to five (5) amperes and a second threshold substantially equal to thirty (30) amperes, the level detection circuit also being configured to generate a second level detection signal if a magnitude of the electrical current signal is greater than thirty (30) amperes. A microprocessor circuit is coupled to the sensor and the level detection circuit. The microprocessor circuit is programmed to: compare the sensor signal to a first arc fault signature and a second arc fault signature, the arc detection circuit being configured to provide an arc detection signal in response to the first level detection signal if the sensor signal corresponds to the first arc fault signature; and, provide an arc detection signal in response to the second level detection signal if the sensor signal corresponds to the second arc fault signature. A circuit interrupter is coupled to the microprocessor circuit, the circuit interrupter being configured to disconnect a load from the electrical distribution system in response to the arc detection signal.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
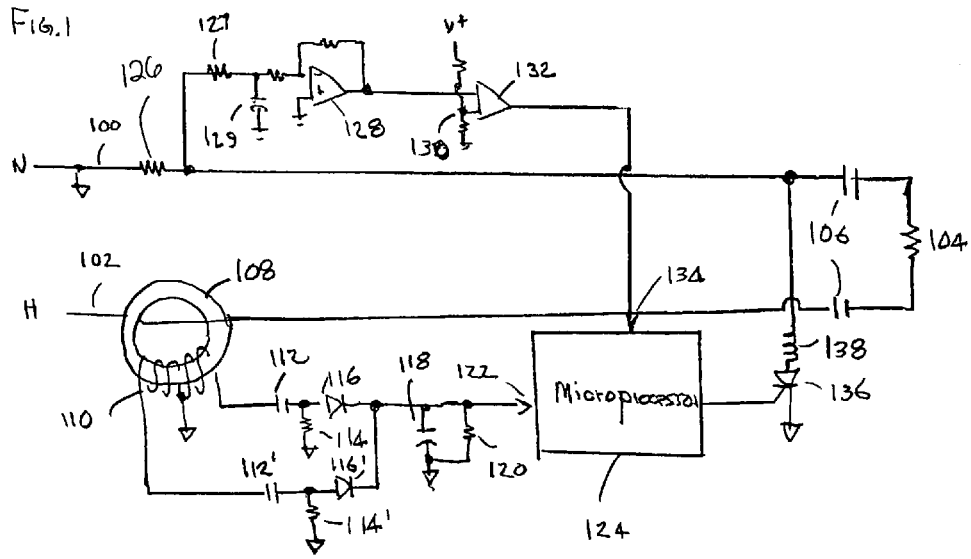
FIG. 1 shows a circuit which detects series and parallel arc faults and interrupts the arcing current within prescribed time allowances.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the AFCI of the present invention is shown in FIG. 1, and is designated generally throughout by reference numeral 10.

Arc faults are detected on the basis of monitoring the current of the protected branch circuit. The present invention is configured to distinguish routine electrical noise current from current irregularities that represent a true arc fault condition. Examples of routine electrical noise current include noise current caused by arcs generated by motor brushes or the toggling of wall switches. While the signal to noise ratio is poorer for low current A-type series arc faults as compared to high current parallel B-type arcs, a longer period is allowed for the AFCI device to interrupt series arc faults because more time may be allotted to examine the lower current waveform.

Referring to FIG. 1, a circuit configured to detect series and parallel arc faults and to interrupt the arcing current within the prescribed time allowances is shown. A hot conductor 102 and a neutral conductor 100 carry current to a load 104 through normally closed interrupting contacts 106. A current derivative (di/dt) sensor 108 monitors the current to load 104, which is normally a sine wave established by the source of line voltage. Di/dt sensor 108 is preferably a toroidal transformer, with a secondary winding 110 of sensor 108 being preferably center tapped.

A first high pass filter composed of a capacitor 112 and a resistor 114 is connected to one end of secondary winding 108 and a second high pass filter composed of a resistor 112' and a capacitor 114' is connected to the other end of secondary winding 108. First and second high pass filters are chosen to block the power line frequency but pass a sharply rising derivative (di/dt) signal caused by noise or arcing faults through diodes 116 or 116', whichever is forward biased, to charge a holding capacitor 118 in parallel with a bleeder resistor 120. The voltage on capacitor 118 is fed to an input 122 of a microprocessor 124.

At the same time, the load current is sensed across a resistive shunt element 126 in series with line conductor 100 as shown, or optionally in series with neutral conductor 102, low pass filtered by a resistor 127 and a capacitor 129 to strip off high frequency signals while leaving the line frequency and harmonics thereof, and amplified by an amplifier 128. If the instantaneous amplified signal exceeds a predetermined reference voltage 130, a comparator 132 produces a logic HIGH signal at an input 134 of microprocessor 124. Microprocessor 124 discerns whether the signal at input 122 is due to an arc fault condition or noise condition, determined from one set of characteristics if the signal at input 134 to microprocessor 124 is a logic LOW, and from a second set of characteristics if the signal at input 134 to microprocessor 124 is a logic HIGH. When the signal at input 134 is at a logic LOW, indicative of a low arc fault current, the first set of characteristics is enabled, typically allowing pulses on capacitor 118 to be considered for a longer period of time, thereby increasing noise immunity of the circuit. When input 134 is at a logic HIGH, indicative of the rare occasions of high arc fault current, the second set of characteristics are enabled to allow microprocessor 124 to respond quickly. Once an arc fault is discerned by one set of enabled characteristics, microprocessor 124 triggers an SCR 136 to connect a solenoid 138 across hot and neutral conductors 102 and 100 to trip interrupting contacts 106, thereby disconnecting load 104 from line voltage and interrupting the arc fault current.

Figure 2:
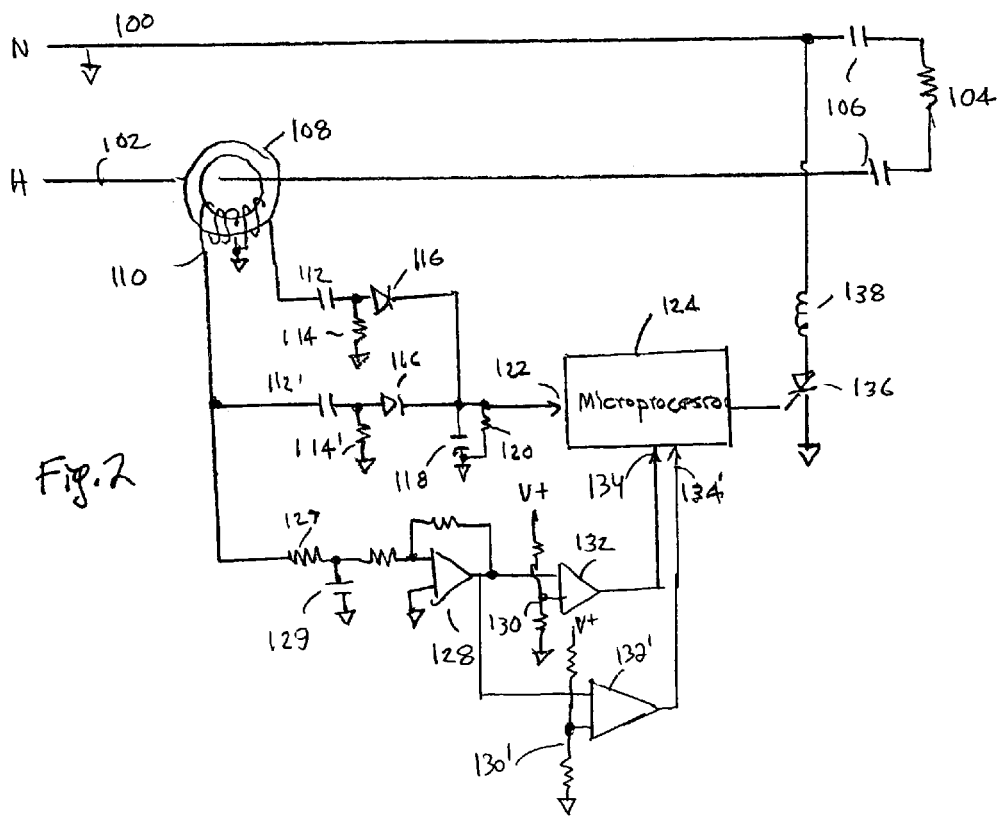
FIG. 2 shows an alternate embodiment which detects series and parallel arc faults and interrupts the arcing current with prescribed time allowances.

FIG. 2 is an alternate embodiment where electrical components 127, 128, 129, 130 and 132 bear like designations and functions to those components in the embodiment of FIG. 1. In this embodiment, however, the input of the low pass filter composed of resistor 127 in combination with capacitor 129 is connected to the same end of secondary winding 110 that the second high pass filter composed of capacitor 112' and resistor 114' is connected to. Sensor 108 provides both the functions of di/dt sensing as previously described with respect to FIG. 1, as well as load current sensing, which required resistive shunt element 126 in the embodiment of FIG. 1.

As described above, the first set of characteristics establishes if a low level arc fault is occurring, while the second set of characteristics establishes if a high level arc fault current is occurring. The sets of characteristics are preferably pre-established by microprocessor 124. Alternatively, the first set of characteristics covers the entire range of anticipated arc fault currents, approximately ranging between 5 amperes to 500 amperes as previously described, while the second set of characteristics is enabled only when arc fault currents exceed the rating of the overcurrent device protecting the branch circuit i.e., usually ranging above approximately 30 amperes. As shown in FIG. 2, the 5 ampere threshold may be provided by an additional comparator 132' and threshold reference 130' that provides signal to microprocessor 124 input 134'.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An arc fault protective device comprising:
   a sensor configured to generate a sensor signal in response to an electrical current signal propagating in an electrical distribution system;
   a level detection circuit coupled to the electrical distribution system, the level detection circuit being configured to generate a first level detection signal if a magnitude of the electrical current signal is between a first predetermined threshold level and a second predetermined threshold level, the level detection circuit also being configured to generate a second level detection signal if a magnitude of the electrical current signal is greater than the second predetermined threshold level;
   an arc detection circuit coupled to the sensor and the level detection circuit, the arc detection circuit being configured to compare the sensor signal to a first arc fault signature and a second arc fault signature, the arc detection circuit being configured to provide an arc detection signal in response to the first level detection signal if the sensor signal corresponds to the first arc fault signature, and the arc detection circuit also being configured to provide an arc detection signal in response to the second level detection signal if the sensor signal corresponds to the second arc fault signature; and
   a response mechanism coupled to the arc detection circuit, the response mechanism being responsive to the arc detection signal.

2. The device according to claim 1, wherein the level detection circuit includes a shunt that provides the level detection circuit with the electrical current signal.

3. The device according to claim 1, wherein the sensor includes a toroidal transformer.

4. The device according to claim 1, wherein the level detection circuit includes a comparator for sensing the magnitude of the arc fault condition.

5. The device according to claim 1, wherein the sensor signal represents a derivative (di/dt) component of the electrical current signal.

6. The device according to claim 5, wherein the derivative (di/dt) component is compared to the first arc fault signature and the second arc fault signature.

7. The device according to claim 5, wherein the toroidal transformer includes a tapped secondary winding.

8. The device according to claim 1, wherein the second arc fault signature includes the first arc fault signature.

9. The device according to claim 1, wherein the first level detection signal is provided in response to a series arc fault condition and the second level detection signal is provided in response to a parallel arc fault condition.

10. The device according to claim 9, wherein the first predetermined threshold level is substantially equal to five (5) amperes and the second predetermined threshold level is substantially equal to thirty (30) amperes.

11. The device according to claim 1, wherein the response mechanism includes a circuit interrupter that disconnects a load from the electrical distribution system in response to the arc detection signal.

12. The device according to claim 1, wherein the arc detection circuit is not configured to provide the arc detection signal in response to the first level detection signal if the sensor signal does not correspond to the first arc fault signature.

13. The device according to claim 1, wherein the arc detection circuit is not configured to provide the arc detection signal if the magnitude of the electrical current signal is below the first predetermined threshold level.

14. The device according to claim 1, wherein the arc detection circuit is configured to provide an arc detection signal in response to the first level detection signal if the sensor signal corresponds to the second arc fault signature.

15. The device according to claim 1, wherein the arc detection circuit is not configured to provide an arc detection signal in response to the second level detection signal if the sensor signal corresponds to the first arc fault signature.

16. The device according to claim 1, wherein the arc detection circuit is not configured to provide an arc detection signal in response to the second level detection signal if the sensor signal does not correspond to the second arc fault signature.

17. The device according to claim 1, wherein the first predetermined threshold level is substantially equal to five (5) amperes and the second predetermined threshold level is substantially equal to thirty (30) amperes.

18. An arc fault protective device comprising:
a sensor configured to generate a sensor signal in response to an electrical current signal propagating in an electrical distribution system;
a level detector coupled to the electrical distribution system, the level detector comparing a magnitude of the electrical current signal to at least one predetermined threshold level, the level detector providing at least one control signal if the magnitude is greater than the at least one predetermined threshold level;
an arc detector coupled to the at least one sensor and the level detector, the arc detector providing an arc detection signal in response to the at least one control signal if the sensor signal corresponds to the arc fault signature; and
a response mechanism coupled to the arc detector that is responsive to the detected arc fault.

19. The device according to claim 18, further comprising a shunt coupled to the level detector, the shunt providing the magnitude to the level detector.

20. The device according to claim 18, wherein the at least one sensor includes a toroidal transformer.

21. The device according to claim 20, wherein the toroidal transformer includes a center tapped secondary winding.

22. The device according to claim 20, wherein the sensor signal provides a derivative (di/dt) component of the electric current signal.

23. The device according to claim 18, wherein the at least one control signal is provided in response to a series arc fault condition.

24. The device according to claim 23, wherein the at least one predetermined threshold level is substantially equal to 5 Amperes.

25. The device according to claim 23, wherein the at least one control signal is activated if the magnitude of the electric current signal is greater than approximately 5 Amperes.

26. The device according to claim 18, wherein the response mechanism includes a circuit interrupter that disconnects a load from the electrical distribution system in response to the arc detection signal.

27. An arc fault protective device comprising:
a sensor configured to generate a sensor signal in response to an electrical current signal propagating in an electrical distribution system;
a level detection circuit coupled to the electrical distribution system, the level detection circuit being configured to generate a first level detection signal if a magnitude of the electrical current signal is between a first threshold substantially equal to five (5) amperes and a second threshold substantially equal to thirty (30) amperes, the level detection circuit also being configured to generate a second level detection signal if a magnitude of the electrical current signal is greater than thirty (30) amperes;
an arc detection circuit coupled to the sensor and the level detection circuit, the arc detection circuit being configured to compare the sensor signal to a first arc fault signature and a second arc fault signature, the arc detection circuit being configured to provide an arc detection signal in response to the first level detection signal if the sensor signal corresponds to the first arc fault signature, and the arc detection circuit also being configured to provide an arc detection signal in response to the second level detection signal if the sensor signal corresponds to the second arc fault signature; and
a circuit interrupter coupled to the arc detection circuit, the circuit interrupter being configured to disconnect a load from the electrical distribution system in response to the arc detection signal.

28. An arc fault protective device comprising:
a sensor configured to generate a sensor signal in response to an electrical current signal propagating in an electrical distribution system;
a level detection circuit coupled to the electrical distribution system, the level detection circuit being configured to generate a first level detection signal if a magnitude of the electrical current signal is between a first threshold substantially equal to five (5) amperes and a second threshold substantially equal to thirty (30) amperes, the level detection circuit also being configured to generate a second level detection signal if a magnitude of the electrical current signal is greater than thirty (30) amperes;
a microprocessor circuit coupled to the sensor and the level detection circuit, the microprocessor circuit being programmed to,
compare the sensor signal to a first arc fault signature and a second arc fault signature, the arc detection circuit being configured to provide an arc detection signal in response to the first level detection signal if the sensor signal corresponds to the first arc fault signature, and provide an arc detection signal in response to the second level detection signal if the sensor signal corresponds to the second arc fault signature; and a circuit interrupter coupled to the microprocessor circuit, the circuit interrupter being configured to disconnect a load from the electrical distribution system in response to the arc detection signal.

* * * * *